US007169731B2

(12) United States Patent
Chondroudis et al.

(10) Patent No.: US 7,169,731 B2
(45) Date of Patent: Jan. 30, 2007

(54) METHOD FOR THE SYNTHESIS OF A FUEL CELL ELECTROCATALYST

(75) Inventors: Konstantinos Chondroudis, Sunnyvale, CA (US); Martin Devenney, Mountain View, CA (US); Alexander Gorer, San Jose, CA (US)

(73) Assignees: Symyx Technologies, Inc., Santa Clara, CA (US); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/777,386

(22) Filed: Feb. 12, 2004

(65) Prior Publication Data

US 2004/0259725 A1 Dec. 23, 2004

Related U.S. Application Data

(60) Provisional application No. 60/446,709, filed on Feb. 12, 2003.

(51) Int. Cl.
*B01J 21/18* (2006.01)
*B22F 1/00* (2006.01)
*C21B 15/04* (2006.01)
*C22C 33/00* (2006.01)
*C22C 1/00* (2006.01)

(52) U.S. Cl. .......................... 502/185; 75/370; 75/371; 420/129; 420/590

(58) Field of Classification Search ................ 502/185; 75/370, 371
See application file for complete search history.

(56) References Cited

U.S. PATENT DOCUMENTS 3,357,819 A  12/1967  Landsberg
3,902,917 A  9/1975   Baresel et al.
3,916,532 A  11/1975  Jaeger et al.
4,001,944 A  1/1977   Williams (Continued)

FOREIGN PATENT DOCUMENTS

EP      0 129 399 A1      12/1984

(Continued)

OTHER PUBLICATIONS

K.Y. Chen, "Preparation and Characterization of High-Performance Pt-Ru/WO$_3$/C Anode Catalysts for the Oxidation of Impure Hydrogen," Electrochemical and Solid State Letters, 2000, 3 (1), p. 10-12.

(Continued)

*Primary Examiner*—J. A. Lorengo
*Assistant Examiner*—Patricia L. Hailey
(74) *Attorney, Agent, or Firm*—Senniger Powers

(57) ABSTRACT

A method for forming a supported metal-containing powder. The method comprises forming a dispersion of a particulate support in a solution, which comprises a solvent and a dissolved metal. Heat is removed from the dispersion to precipitate the dissolved metal from the solution onto the particulate support. Preferably, enough heat is removed to freeze the solution. Also, the heat is removed is preferably removed from the dispersion by contacting a container containing the dispersion with a cryogenic liquid. After precipitating the dissolved metal onto the particulate support, the particulate support is separated from the solution, preferably by freeze-drying, to yield the supported metal-containing powder, which comprises the particulate support and a precipitated metal thereon.

51 Claims, 1 Drawing Sheet

U.S. PATENT DOCUMENTS

| | | | |
|---|---|---|---|
| 4,454,169 A * | 6/1984 | Hinden et al. | 427/125 |
| 4,507,401 A * | 3/1985 | Dubois et al. | 502/242 |
| 4,536,482 A * | 8/1985 | Carcia | 502/5 |
| 4,615,736 A * | 10/1986 | Armor et al. | 420/469 |
| 4,915,905 A * | 4/1990 | Kampe et al. | 420/418 |
| 5,055,441 A | 10/1991 | McCarron, III et al. | |
| 5,192,735 A | 3/1993 | Pagotto et al. | |
| 5,480,851 A | 1/1996 | Tsurumi et al. | |
| 6,066,410 A * | 5/2000 | Auer et al. | 429/40 |
| 6,184,428 B1 | 2/2001 | Zahoor et al. | |
| 6,326,098 B1 * | 12/2001 | Itoh et al. | 429/40 |
| 6,348,431 B1 | 2/2002 | Even, Jr. | |
| 6,498,121 B1 * | 12/2002 | Gorer | 502/325 |
| 6,514,903 B2 | 2/2003 | Lin et al. | |
| 6,517,965 B1 * | 2/2003 | Gorer | 429/40 |
| 6,627,571 B1 * | 9/2003 | Lugmair et al. | 502/2 |
| 6,723,678 B2 * | 4/2004 | Gorer | 502/326 |
| 2001/0027160 A1 | 10/2001 | Lee et al. | |
| 2002/0132040 A1 | 9/2002 | Finkelshtain et al. | |
| 2003/0000340 A1 * | 1/2003 | Mende et al. | 75/351 |
| 2003/0104936 A1 | 6/2003 | Mao et al. | |
| 2004/0137310 A1 * | 7/2004 | Kiros | 429/42 |
| 2005/0037920 A1 * | 2/2005 | Devenney et al. | 502/313 |
| 2006/0019825 A2 * | 1/2006 | Devenney et al. | 502/313 |

FOREIGN PATENT DOCUMENTS

| | | |
|---|---|---|
| EP | 0 552 587 A1 | 7/1993 |
| EP | 1 254 712 A1 | 11/2002 |
| FR | 2 315 318 A1 | 1/1977 |
| WO | WO 03/069706 A2 | 8/2003 |
| WO | WO 03/077337 A1 | 9/2003 |
| WO | WO 03/081702 A2 | 10/2003 |
| WO | WO 2004/073096 * | 8/2004 |

OTHER PUBLICATIONS

D. Chu and S. Gilman, "Methanol Electro-oxidation on Unsupported Pt-Ru Alloys at Different Temperatures," J. Electrochem. Soc., 1996, 143 (5), p. 1685-1690.

T.R. Ralph and M.P. Hogarth, "Catalysis for Low Temperature Fuel Cells Part 1: The Cathode Challenges," Platinum Metals Rev., 2002, 46 (1), p. 3-14.

International Search Report for Application No. PCT/US2004/004545, dated Jul. 29, 2004, 14 pages.

* cited by examiner

US 7,169,731 B2

METHOD FOR THE SYNTHESIS OF A FUEL CELL ELECTROCATALYST

CROSS-REFERENCE TO RELATED APPLICATIONS

This application claims the benefit of U.S. Provisional Application 60/446,709, filed Feb. 12, 2003, which is hereby incorporated herein by reference.

BACKGROUND OF THE INVENTION

1. Field of the Invention

The present invention is generally directed to a method for forming deposits of a metal species on a support for use as a catalyst. These catalyst are particularly well suited for use as an electrocatalyst in fuel cells.

2. Description of Related Technology

A fuel cell is an electrochemical device for directly converting the chemical energy generated from an oxidation-reduction reaction of a fuel such as hydrogen or hydrocarbon-based fuels and an oxidizer such as oxygen gas (e.g., in air) supplied thereto into a low-voltage direct current. For the oxidation and reduction reactions in a fuel cell to proceed at useful rates, especially at operating temperatures below about 300° C., electrocatalyst materials are typically supplied at the electrodes. Initially, fuel cells used electrocatalysts made of a single metal, usually platinum (Pt), palladium (Pd), rhodium (Rh), iridium (Ir), osmium (Os), silver (Ag) or gold (Au) because they are able to withstand the corrosive environment—platinum being the most efficient and stable single-metal electrocatalyst for fuel cells operating below about 300° C. Although platinum is the most efficient and stable single-metal electrocatalyst for fuel cells, it is costly and an increase in electrocatalyst activity over platinum is generally considered to be necessary for wide scale commercialization of fuel cell technology. An improvement in catalysts may take many forms such as increased activity, increase corrosion resistance, increased poison tolerance, and/or decreased costs. For example, increased tolerance to CO has been reported by alloying platinum and ruthenium at a 50:50 atomic ratio (see, D. Chu and S. Gillman, J. Electrochem. Soc. 1996, 143, 1685). Ideally, a reduction in cost will accompany an improvement in one or more of the preceding performance characteristics.

Fuel cell electrocatalysts were first used in fuel cells in metallic powder form. However, techniques have been developed to disperse these metals over the surface of electrically conductive supports (e.g., carbon black) to increase the surface area of the electrocatalyst which in turn increased the number of reactive sites leading to improved efficiency of the cell.

BRIEF SUMMARY OF THE INVENTION

The present invention is directed to a method for forming a supported metal-containing powder. The method comprising forming a dispersion of a particulate support in a solution, wherein the solution comprises a solvent and a dissolved metal and the dispersion has a volumetric ratio of the particulate support to the solvent is at least about 1:10. Heat is removed from the dispersion to precipitate the dissolved metal from the solution onto the particulate support. After precipitating the dissolved metal, the particulate support is separated from the solution to yield the supported metal-containing powder, the powder comprising the particulate support and a precipitated metal thereon.

The present invention is also directed to a method for forming a supported metal-containing powder that comprises forming a dispersion of a particulate support in a solution wherein the solution comprises a solvent and a dissolved metal. The method further comprises removing heat from the dispersion to precipitate the dissolved metal from the solution onto the particulate support and to freeze the solution. The heat is removed from the dispersion by contacting a container containing the dispersion with a cryogenic liquid. After precipitating the dissolved metal, the particulate support is separated from the solution by freeze-drying to yield the supported metal-containing powder, the powder comprising the particulate support and a precipitated metal thereon.

Additionally, the present invention is directed to a method of forming a carbon supported platinum alloy. The method comprises forming a dispersion of a carbon supported platinum in a solution, the carbon supported platinum comprising a particulate carbon support and platinum in its metallic oxidation state thereon, and the solution comprising a solvent and a dissolved non-platinum metal. Heat is removed from the dispersion to precipitate the dissolved non-platinum metal from the solution onto the carbon supported platinum and to freeze the solution. The heat is removed from the dispersion by contacting a container containing the dispersion with a cryogenic liquid. After precipitating the dissolved non-platinum metal, the carbon supported platinum is separated from the frozen solution by freeze-drying. After separating the carbon supported platinum, an alloy is formed on the particulate carbon support to yield the carbon supported platinum alloy. The carbon supported platinum alloy comprising the particulate carbon support and the platinum and the non-platinum metal derived from the precipitated non-platinum metal.

The present invention is also directed to a supported metal alloy powder. The supported metal alloy powder comprises: supports; deposits comprising a metal alloy on the supports, wherein the metal alloy comprises a non-noble metal; a loading of deposits on the supports of at least about 20 weight percent; an average deposit size that is no greater than about 10 nm; and a deposit size distribution wherein at least about 70 percent of the metal alloy deposits are between about 50 and about 150 percent of the average metal alloy deposit size.

The present invention is also directed to a fuel cell electrode, the fuel cell electrode comprising a supported electrocatalyst powder and an electrode substrate upon which the supported electrocatalyst powder is deposited. The fuel cell is characterized in that the supported electrocatalyst powder comprises: supports; deposits comprising a metal alloy on the supports, wherein the metal alloy comprises a non-noble metal; a loading of deposits on the supports of at least about 20 weight percent; an average deposit size that is no greater than about 10 nm; and a deposit size distribution wherein at least about 70 percent of the metal alloy deposits are between about 50 and about 150 percent of the average metal alloy deposit size.

The present invention is also directed to a fuel cell comprising an anode, a cathode, a proton exchange membrane between the anode and the cathode, a supported electrocatalyst powder for the catalytic oxidation of a hydrogen-containing fuel or the catalytic reduction of oxygen. The fuel cell being characterized in that the supported electrocatalyst powder comprises: supports; deposits comprising a metal alloy on the supports, wherein the metal alloy comprises a non-noble metal; a loading of deposits on the supports of at least about 20 weight percent; an average deposit size that is no greater than about 10 nm; and a deposit size distribution wherein at least about 70 percent of the metal alloy deposits are between about 50 and about 150 percent of the average metal alloy deposit size.

The foregoing and other features and advantages of the present invention will become more apparent from the following description and accompanying drawing.

DETAILED DESCRIPTION OF THE INVENTION

Figure 1:
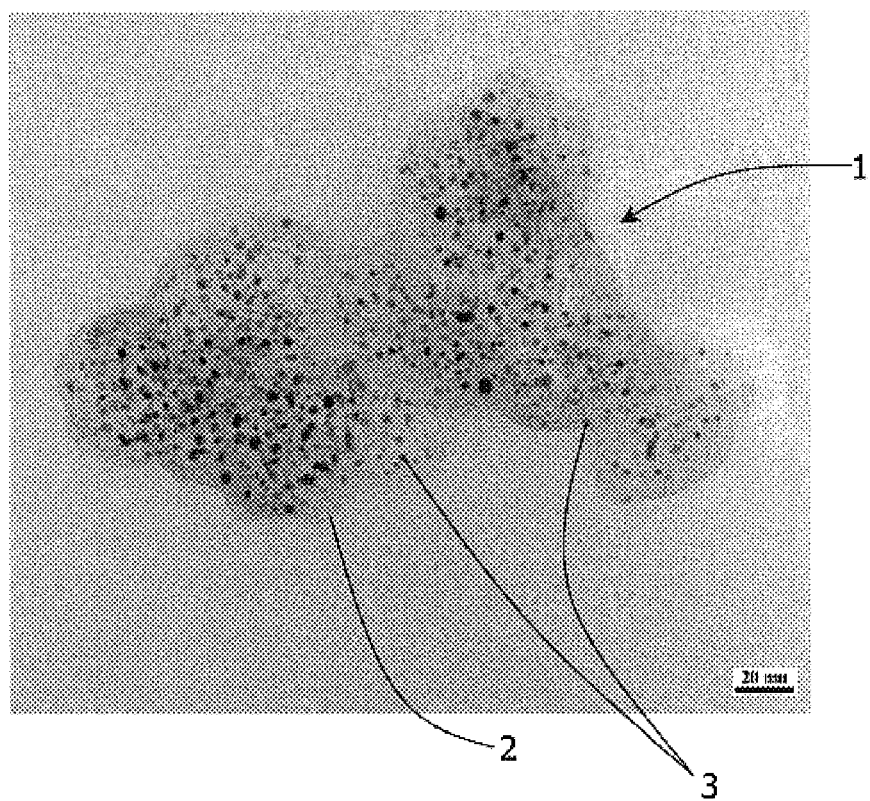
FIG. 1 is a TEM image of a carbon support with platinum alloy nanoparticles deposited thereon in accordance with an embodiment of the present invention.

In general, the present invention is directed to a method for depositing a metal species onto particles. In particular, the method of the present invention comprises forming a dispersion comprising a solution and support particles (also referred to as "supports" and as a "particulate support") dispersed therein, wherein the solution comprises a solvent portion and a solute portion that comprises the constituents of the metal species being deposited (e.g., a dissolved metal from a metal-containing compound that is dissolved). Heat is removed from the dispersion to precipitate the metal species or dissolved metal onto the supports or the particulate support. Typically, the precipitation of the dissolved metal depletes the solute (e.g., the dissolved metal and/or the dissolved metal-containing compound) from the liquid (i.e., a solvent). The supports or the particulate support having the metal species or precipitated metal thereon are separated from the solution. The separation may be accomplished by, for example, filtration, evaporation, sublimation, or a combination thereof.

One embodiment of present invention comprises forming a suspension comprising a solution and supports or a particulate support suspended therein, wherein the solution comprises a solvent portion and a solute portion that comprises the constituents of the metal species being deposited (e.g., a dissolved metal). Heat is removed from the solution to deposit (e.g., precipitate) the metal species (e.g., the dissolved metal) onto the supports or the particulate support and to solidify the suspension by freezing the solution. The solidified suspension is freeze-dried to separate the solvent portion and leave a freeze-dried powder comprising the supports/particulate support and the deposits of the metal species/precipitated metal on the supports.

As indicated above, the present invention is particularly useful for the production of supported metal powders for use as electrocatalysts. Specifically, in one embodiment of the present invention, deposits comprising one or more inorganic metal-containing compounds are deposited on supports (e.g., carbon supports or a particulate carbon support). The deposited inorganic metal-containing compounds are subjected to a thermal treatment to decompose them into metal ions and volatilized material, to reduce the metal ions to their metallic oxidation state (e.g., the average valency is at or near zero), and to alloy the metal atoms, if multiple metals are present. Although there may be portions of the catalyst wherein the oxidation states of one or more of the metals may be greater than about zero, the average oxidation state of each of these elements throughout the entire catalyst is less than the lowest commonly occurring oxidation state for that particular element (e.g., the lowest commonly occurring oxidation state for platinum and ruthenium is 2).

Therefore, the average oxidation states of the platinum and/or ruthenium may be, in order of increasing preference, less than 1, 0.5, 0.1, or 0.01, or even zero. The end product is a supported metal or metal alloy powder comprising the supports and deposits of the metal alloy on the supports. Typically, the metal or metal alloy deposits are substantially smaller than the supports. For example, the metal or metal alloy deposits are generally referred to as nanoparticles because they have a size (i.e., a maximum cross-sectional length) that is no greater than about 20 nm, 10 nm, 5 nm, 2 nm or smaller, whereas the supports typically have an average size that is greater than about 100 nm, and more typically between about 200 and 300 nm. The following disclosure is primarily directed to such an embodiment, however, it is to be understood that this is not intended to limit the applicability of the present invention. For example, the present invention is applicable for depositing a metal species without a subsequent conversion (e.g., reduction) of the metal species or precipitated metal to another material (e.g., a metal in its metallic oxidation state). The present invention is also applicable for forming deposits of a metal species or a precipitated metal that are not converted to another material and/or for forming deposits of a metal species or precipitated metal that may be converted to something other than a reduced metal or metal alloy. For example, a deposited metal species or precipitated metal may be converted to an oxide, a carbide, a nitride, a sulfide, etc., by means known in the art.

A. Solution

The solution in which the supports are dispersed/suspended provides the means for delivering the metal species/precipitated metal which is to be deposited onto the surfaces of the supports/particulate support. As set forth above, the metal species/precipitated metal may be the final desired form, but in many instances it is not. If the metal species/precipitated metal is not a final desired form, the deposited metal species/precipitated metal is referred to as a "precursor" of the final desired form. Examples of such precursors/metal species/precipitated metal include inorganic and organic metal compounds such as metal halides, sulfates, carbonates, nitrates, nitrites, oxalates, acetates, formates, etc. The conversion to the final desired form can be made by thermal decomposition, chemical reduction, or other reaction, using means known to one of ordinary skill in the art. Thermal decomposition, for example, is brought about by heating a precursor to obtain a different solid material and a gaseous material. In general, as is known, thermal decomposition of halides, sulfates, carbonates, nitrates, nitrites, oxalates, acetates, and formates may be carried out at temperatures between about 200 and about 1,200° C.

Since the process may involve sublimation of the solvent portion from the frozen suspension, the solvent portion of the solution in which the supports are suspended preferably has an appreciable vapor pressure below its freezing point. Examples of such sublimable solvents that also dissolve many metal-containing compounds and metals include water, alcohols (e.g., methanol, ethanol, etc.), acetic acid, carbon tetrachloride, ammonia, 1,2-dichloroethane, N,N-dimethylformamide, formamide, etc.

A precursor/metal species/precipitated metal is usually selected such that any unwanted by-products from the conversion can be removed from the powder product. For example, during thermal decomposition the unwanted decomposition products are typically volatilized. Specifically, if the desired final product is an oxide, any precursor which yields a powder that can be freed of unwanted by-products by thermal oxidation may be used. Similarly, if the desired final product is a metal, any precursor which yields a powder that can be separated from unwanted by-products during a thermal reduction may be used. Still further, if the desired final product is an electrocatalyst metal alloy, the metal precursors are typically selected so that the powder comprising the deposited precursors may be reduced without significantly altering the uniformity of the metal deposits on the surface of the supports and/or without significantly altering the particle size of the final powder (e.g., through agglomeration).

Essentially, any metal may be deposited onto supports by the process of the present invention, provided that the metal or compound containing the metal is capable of being dissolved in a suitable medium (i.e., a solvent). Likewise, nearly any metal may be combined with, or alloyed with, any other metal provided the metals or the respective compounds are soluble in a suitable medium. By way of example, many compounds of the following metals are capable of being dissolved in a suitable solvent: copper, silver, gold, vanadium, cerium, tin, tungsten, chromium, molybdenum, rhenium, iron, cobalt, nickel, zinc, manganese, platinum, ruthenium, osmium, rhodium, iridium, palladium, platinum, zirconium, hafnium, titanium, and indium.

In one embodiment of the present invention the solute portion comprises an inorganic metal-containing compound as a source of the metal species being deposited. Examples of the inorganic-metal containing compound include indium (III) nitrate pentahydrate, manganese (II) nitrate, iron (III) nitrate nonahydrate, $(NH_4)Mo_7O_{24}.4H_2O$, ammonium paratungstate $((NH_4)_{10}W_{12}O_{41}.5H_2O)$, rhodium (III) nitrate, chromium (III) nitrate, zinc (II) nitrate hexahydrate, copper (II) nitrate, nickel (II) nitrate hexahydrate, and vanadium (IV) sulfate oxide. The foregoing compounds are highly soluble in water, and, as a result, water is often considered to be a preferred solvent. In some instances, it is desirable for an inorganic metal-containing compound to be dissolved in an acidic solution prior to being mixed with other inorganic metal-containing compounds. For example, rhodium and ammonium paratungstate may be dissolved in an aqueous nitric acid solution.

The solute portion may comprise organometallic compounds. In general, organometallic compounds are typically more costly, contain more impurities than inorganic metal-containing compounds, and require organic solvents. Organic solvents are more costly than water and typically require procedures and/or treatments to control or negate toxicity. As such, in some embodiments organometallic compounds and organic solvents may not be preferred.

To form an alloy having a particular composition or stoichiometry, the amounts of the various metal-containing source compounds necessary to achieve that composition are determined to prepare the solution(s). If the supports comprise a pre-deposited material such as a pre-deposited metal-containing compound and/or a pre-deposited metal in its metallic oxidation state deposited on the supports prior to performing the deposition method as detailed herein, the loading or amount of the metal in the pre-deposited material is typically taken into account when calculating the necessary amount(s) of metal-containing source compound(s). After the appropriate amount(s) of the metal-containing source compound(s) is (are) determined, the solution(s) may be prepared by any appropriate method. For example, if all the selected metal-containing source compounds are soluble at the desired concentration in the same solvent at room temperature, they may merely be mixed with the solvent. Alternatively, the suspending solution may be formed by mixing source solutions, wherein a source solution comprises a particular metal-containing source compound at a particular concentration. Thus, the relative amounts of the metal-containing source compounds are determined by the volumes of the source solutions added together to form the suspending solution. If, however, all the selected compounds are not soluble at the same temperature when mixed together (either as powders in a solvent or as source solutions), the temperature of the mixture may be increased to increase the solubility limit of one or more of the source compounds so that the suspending solution may be formed. For example, when adding a first source solution comprising $(NH_4)Mo_7O_{24}.4H_2O$ and $Rh(NO_3)_3$ in water to a second source solution comprising $Fe(NO_3)_3.9H_2O$ in water, the solubility of the mixture may be incomplete and increasing the temperature of the mixture to, for example, about 100° C. enables the suspending solution to be formed. In addition to adjusting solubility with temperature, the stability of the suspending solution may be adjusted, for example, by the addition of a buffer, by the addition of a complexing agent, and/or by adjusting the pH.

In some situations, the combination of compounds necessary to form the desired deposit composition are incompatible and may result in the formation of an insoluble species upon being mixed. This incompatibility may occur when the compounds are mixed at all concentrations or within particular concentration ranges. Advantageously, the method of the present invention allows for forming deposits having the desired composition of metal species/precipitated metal despite the incompatibility. To form the deposits, the order in which the metal-containing compounds and supports are mixed together may be adjusted. Specifically, a first source solution may be mixed with the supports sufficiently to disperse/suspend (preferably uniformly throughout the first solution) and impregnate the supports with the first source solution and then a second source solution, and, if necessary, additional source solutions are added sequentially. Adding the second source solution after the supports have been dispersed/suspended allows the particles of the insoluble species that form upon mixing the solutions to deposit (e.g., precipitate) uniformly on the supports. What remains is a dispersion/suspension comprising the supports with deposits of the insoluble species thereon in a solution comprising the solvent portion and any remaining soluble compound(s) of the solute portion. The specifics of mixing a solution and the supports to form the suspension are set forth in detail below.

Alternatively, the incompatibility issue may be addressed by performing all or part of the method of the present of the invention more than once. For example, the method of the present invention may be performed to deposit on or more metals on the particulate support from a first solution. Then, after separating the particulate support from the first solution, the particulate support having thereon the precipitated metal(s) from the first solution may be dispersed in an a second solution comprising one or more dissolved metals to form a second dispersion. Heat may then be removed from the second dispersion to precipitate the dissolved metal(s) from the second solution onto the particulate support already having the precipitated metal(s) from the first solution. It is also possible that before dispersing the particulate support in the second or subsequent solution(s) the previously precipitated metal(s) may be reduced to their metallic state and/or alloyed.

In addition to varying the amounts of the various metals to form alloys having different compositions, the method of the present invention allows for a wide variation in the loading of the metal onto the supports. This is beneficial because it allows for the electrocatalytic activity of a supported metal alloy powder to be maximized. The loading may be controlled in part by adjusting the total concentration of the various metals in the solution while maintaining the relative amounts of the various metals. In fact, the concentrations of the inorganic metal-containing compounds may approach the solubility limit for the solution. Typically, however, the total concentration of inorganic metal-containing compounds in the solution is well below their solubility limits. For example, the total concentration of inorganic metal-containing compounds is typically between about 0.01 and about 5 M. Preferably, the total concentration of inorganic metal-containing compounds in the solution is between about 0.1 and about 1 M. Concentrations below the solubility limit are used because it is desirable to maximize the loading of the supported metal alloy electrocatalysts without decreasing the surface area of the metal deposits. Depending, for example, on the particular composition, the size of the deposits, and the uniformity of the distribution of deposits on the supports, the loading may typically be between about 5 and about 60 weight percent. Preferably, the loading is between about 10 and about 50 weight percent. More preferably, the loading is between about 20 and 40 weight percent. Still more preferably, the loading is about 40 weight percent.

B. Supports

The supports/particular support upon which the metal species/precipitated metal is to be deposited may be of any size and composition that is capable of being dispersed/suspended in the solution during the removal of heat. The maximum size of the supports depends on several parameters including agitation of the suspension, density of the supports, specific gravity of the solution, and the rate at which heat is removed from the system. Although not necessary, the supports are preferably inert to the solution.

In one embodiment of the present invention, the supports are electrically conductive and are useful for supporting electrocatalytic compounds in electrochemical reaction cells (e.g., fuel cells). Such electrically conductive supports are typically inorganic, for example, carbon supports. However, the electrically conductive supports may comprise an organic material such as an electrically conductive polymer (see, e.g., in U.S. Pat. Appln. 2002/0132040 A1). Carbon supports may be predominantly amorphous or graphitic and they may be prepared commercially, or specifically treated to increase their graphitic nature (e.g., heat treated at a high temperature in vacuum or in an inert gas atmosphere) thereby increasing corrosion resistance. Carbon black support particles may have a Brunauer, Emmett and Teller (BET) surface area up to about 2000 $m^2/g$. It has been reported that satisfactory results are achieved using carbon black support particles having a high mesoporous area, e.g., greater than about 75 $m^2/g$ (see, e.g., Catalysis for Low Temperature Fuel Cells Part 1: The Cathode Challenges, T. R. Ralph and M. P. Hogarth, Platinum Metals Rev., 2002, 46, (1), p. 3–14). Experimental results to date indicate that a surface area that is between about 200 and about 1000 $m^2/g$ is preferred. More preferably, the surface area of the carbon support particles is between about 300 and about 700 $m^2/g$. Still more preferably, the surface area of the carbon support particles is about 500 $m^2/g$.

As set forth above, the supports may have a pre-deposited material thereon, which may be, for example, a pre-deposited metal such as platinum, palladium, nickel, etc. In fact, when the final composition of the deposits on the carbon supports is a platinum alloy, it may be advantageous to use a carbon supported platinum powder. Such powders are commercially available from companies such as Johnson Matthey, Inc., of New Jersey and E-Tek Div. of De-Nora, N.A., Inc., of Sommerset, New Jersey an may be selected to have a particular loading of platinum. The amount of platinum loading is selected in order to achieve the desired stoichiometry of the supported metal alloy. Typically, the loading of platinum is between about 5 and about 60 weight percent. Preferably, the loading of platinum is between about 15 and 45 weight percent. The size (i.e., the maximum cross-sectional length) of the platinum deposits is typically less than about 20 nm. For example, the size of the platinum deposits may be less than about 10 nm, 5 nm, 2 nm, or smaller. Preferably, the size of the platinum deposits is between about 2 and about 3 nm. Experimental results to date indicate that a desirable supported platinum powder may be further characterized by having a platinum surface area of between about 150 and about 170 $m^2/g$ (determined by CO adsorption), a combined carbon and platinum surface area of between about 350 and about 400 $m^2/g$ (determined by $N_2$ adsorption), and an average support size that is between about 100 and about 300 nm.

C. Formation of the Dispersion/Suspension

In accordance with the present invention the above-described solution and supports may be mixed to form a dispersion/suspension. The mixing may be accomplished by any appropriate method known to one of ordinary skill in the art. Exemplary methods of mixing by magnetic stirring, insertion of a stirring structure (e.g., a rotor), shaking, sonication, or a combination of the foregoing methods.

Provided that the supports can be adequately mixed with the solution, the relative amounts of supports and solution may vary over a wide range. For example, when preparing carbon supported metal electrocatalysts using an aqueous suspension comprising dissolved inorganic metal-containing compounds, the carbon supports typically comprise between about 1 and about 30 weight percent of the suspension. In order of increasing preference, the carbon supports comprise between about 1 and about 15 weight percent of the suspension, between about 1 and about 10 weight percent of the suspension, between about 3 and about 8 weight percent of the suspension, between about 5 and about 7 weight percent of the suspension, or about 6 weight percent of the suspension. In this regard it is to be noted that the above-referenced amounts of carbon supports in suspension may apply equally to other, non-carbon supports.

The relative amounts of supports and solution may also be described in terms of volumetric ratios. For example, the dispersion/suspension may have a volumetric ratio of support particles to solution or solvent that is at least about 1:10. Specifying a minimum volumetric ratio indicates that the volume of support particles may be increased relative to the volume of solution or solvent. As such, in order of increasing preference, the volume ratio of support particles to solution or solvent may be at least about 1:8, 1:5, or 1:2.

In one embodiment of the present invention the solution and supports are mixed using sonication at a power and for a duration sufficient to form a dispersion/suspension in which the pores of the supports are impregnated with the solution and/or the supports are uniformly distributed throughout the solution. If the dispersion/suspension is not uniformly mixed (i.e., the supports are not uniformly impregnated with the solution and/or the supports are not uniformly distributed throughout the solution), the deposits formed on the supports will typically be non-uniform (e.g., the loading of the metal species may vary among the supports, the size of the deposits may vary significantly on a support and/or among the supports, and/or the composition of the deposits may vary among the supports). Although a uniform distribution of supports in the solution is generally preferred, there may be circumstances in which a non-uniform distribution of supports in the solution is desirable.

Typically the uniformity of the distribution of particles in the dispersion/suspension is maintained throughout the removal of heat from the dispersion/suspension. This uniformity may be maintained by continuing the mixing of the dispersion/suspension as it is being cooled. The uniformity may, however, be maintained without mixing by the viscosity of the dispersion/suspension. The actual viscosity needed to uniformly suspend the particles depends in large part on the amount of supports in the dispersion/suspension and the size of the supports. To a lesser degree, the necessary viscosity depends on the density of the supports and the specific gravity of the solution. In general, the viscosity is typically sufficient to prevent substantial settling of the supports as the heat is being removed from the suspension to precipitate the deposits, and/or, if desired, until the dispersion/suspension is solidified by the freezing of the solution or solvent. The degree of settling, if any, may be determined, for example, by examining portions of the solidified or frozen suspension. Typically, substantial settling would be considered to have occurred if the concentration of supports in any two portions vary by more than about ±10%. When preparing a carbon supported metal-containing powder, the viscosity of the suspension/dispersion is typically sufficient to prevent substantial settling for at least about 4 minutes. In fact, the viscosity of the suspension/dispersion may be sufficient to prevent substantial settling for at least about 10 minutes, at least about 30 minutes, at least about 1 hour, or even up to about 2 days. Typically, the viscosity of the dispersion/suspension is at least about 5,000 mPa·s.

D. Removing Heat from the Dispersion/Suspension

Heat is removed from the dispersion/suspension so that at least a part of the solute portion separates from the solvent portion and deposits (e.g., precipitates) a metal species/precipitated metal onto the supports and/or onto any pre-existing deposits (e.g., a pre-deposited metal and/or pre-deposited metal species formed, for example, by precipitation of incompatible solutes). If the concentration of supports in the suspension is sufficient (e.g., within the ranges set forth above) and enough heat is removed, nearly all of the metal species to be deposited is separated from the solvent portion to form deposits (e.g., precipitates) comprising the metal species on the supports. In one embodiment the heat is removed to solidify or freeze the dispersion/suspension and form a composite comprising the supports/particulate support with deposits comprising the metal species or a precipitated metal on the supports/particulate support within a matrix of the solvent portion in a solid state. If the concentration of the solute portion in the solution exceeds the ability of the supports to accommodate deposits of the metal species, some of the solute portion may crystallize within the matrix. If this occurs, such crystals are not considered to be a supported powder.

In one embodiment of the present invention the deposits of metal species are precursors of a metal alloy and the size of the metal species deposits is controlled such that the eventually formed metal alloy deposits are of size suitable for use as a fuel cell electrocatalyst (e.g., no greater than about 20 nm, 10 nm, 5 nm, or 2 nm in size, or smaller). As set forth above, control of the alloy deposit size is accomplished, at least in part, by maintaining a well impregnated and uniformly distributed suspension throughout the removal of heat from the system. Additionally, the control of the deposit size is accomplished by rapidly removing heat from the dispersion/suspension as the compound or compounds are depositing on supports.

The rapid heat removal may comprise cooling the dispersion/suspension from a temperature of at least about 20° C. to a temperature below the freezing point of the solvent at a rate of, for example, at least about 20° C./minute. In order of increasing preference, the heat removal comprises cooling the dispersion/suspension at a rate of at least about 50, 60, 70, 80, 90, or 100° C./minute. As such, the dispersion/suspension may be cooled at a rate that is between about 50 and about 100° C./minute or at a rate that is between about 60 and about 80° C./minute. Typically, removal of heat is at a rate that allows for the temperature of the suspension to be reduced from a temperature such as room temperature (about 20° C.) or higher (e.g., about 100° C.) to the freezing point of the solution or solvent within a relatively short period of time (e.g., not more than about 10, 5, or 3 minutes).

The heat may be removed from the dispersion/suspension by any appropriate method. For example, a container containing a volume of the dispersion/suspension may be placed within a refrigeration unit such as freeze-dryer, a volume of dispersion/suspension may be contacted with a cooled surface (e.g., a plate or container), a volume of dispersion/suspension in a container may be contacted with a cryogenic liquid. Advantageously, the same container may also be used during the formation of the dispersion and/or during the separation of solvent from deposited supports. In one embodiment a cover is placed over an opening of the container. Although the cover may completely prevent the escape of any matter from the container, the cover preferably allows for a gas to exit the container while substantially preventing the supports from exiting the container. An example of such a cover includes a stretchable film (e.g., PARAFILM) having holes that are, for example, less than about 500, 400, or 300 µm in size (maximum length across the hole).

In one embodiment the dispersion/suspension is cooled at a rate of at least about 20° C./minute by immersing or contacting a container containing the dispersion/suspension in or with a volume of cryogenic liquid within a cryogen container sized and shaped so that at least a substantial portion of its surface is contacted with the cryogenic liquid (e.g., at least about 50, 60, 70, 80, or 90 percent of the surface of the dispersion/suspension container). The cryogenic liquid is typically at a temperature that is at least about 20° C. below the freezing point of the solvent. Examples of suitable cryogenic liquids typically include liquid nitrogen, liquid helium, liquid argon, but even less costly media may be utilized. For example an ice water/hydrous calcium chloride mixture can reach temperatures down to about −55° C., an acetone/dry ice mixture that can reach temperatures down to about −78° C., and a diethyl ether/dry ice mixture that can reach temperatures down to about −100° C.

The container may be made of nearly any type of material, provided the material will withstand repeated uses without structural failure (e.g., resistant to thermal shock), does not contribute impurities to the suspension (e.g., resistant to chemical attack), and is thermally conductive. For example, plastic vials made from high density polyethylene may be used.

E. Separation of the Deposited Supports and the Solvent

The supports having the deposits thereon may be separated from the solvent portion by any appropriate method such as filtration, evaporation (e.g., by spray-drying), sublimation (e.g., freeze-drying), or a combination thereof. The evaporation or sublimation rate may be enhanced by adding heat (e.g., raising the temperature of the solvent) and/or decreasing the atmospheric pressure to which the solvent is exposed.

In one embodiment a frozen or solidified suspension is freeze-dried to remove the solvent portion. The freeze-drying may be carried out in any appropriate apparatus such as a LABCONCO FREEZE DRY SYSTEM (Model 79480). Intuitively, one of skill in the art would typically maintain the temperature of the frozen suspension below the melting point of the solvent (i.e., the solvent is removed by sublimation) in order to prevent agglomeration of the supports. The process of the present invention may be carried out under such conditions. Surprisingly, however, it is not critical that solvent portion be prevented from melting. Specifically, it has been discovered that a free-flowing, non-agglomerated powder may be prepared even if the solvent is allowed to melt, provided that the pressure within the freeze-dryer is maintained at a level that the evaporation rate of the liquid solvent is faster than the melting rate (e.g., below about 0.2 millibar, 0.000197 atm, or 20 Pa). Thus, there is typically not enough solvent in the liquid state to result in agglomeration of the supports. Advantageously, this can be used to decrease the time needed to remove the solvent portion. Removing the solvent portion forms a free-flowing, non-agglomerated supported powder that comprises the supports/particulate support and deposits comprising one or more metal species or precipitated metals on the supports/particulate support.

F. Reduction and Alloying of Deposited Metal Precursor Compounds

If the deposited metal species or precipitated metal(s) is (are) the desired final deposit, then conversion is not necessary. However, in one embodiment of the present invention the desired final deposit is a metal at its metallic oxidation state or a metal alloy (in which the metals of the alloy are in their metallic oxidation states) and the deposited metal species or precipitated metal(s) is (are) considered to be a precursor or precursors. To accomplish the conversion from precursor to metal, the powder is typically heated in a reducing atmosphere (e.g., an atmosphere containing hydrogen and/or an inert gas such as argon) at a temperature sufficient to decompose the precursor.

The method of the present invention may be used to form deposits other than metals on the supports by adjusting the atmosphere to which the precursor compounds are exposed during the heat treatment. For example, if the desired deposits are oxides, the conversion may be accomplished by thermal decomposition in an oxidizing atmosphere. Similarly, if carbides or nitrides are the desired deposits, the conversion may be accomplished by thermal decomposition in a carburizing atmosphere (e.g., $CO_2$) or a nitriding atmosphere (e.g., $N_2$ and/or ammonia), respectively.

The temperature reached during the thermal treatment is typically at least as high as the decomposition temperature (s) for the precursor compound(s) and not so high as to result in degradation of the supports and agglomeration of the supports. Accordingly, the temperature may be between about 60° C. and about 1100° C., between about 100 and about 1000° C., between about 200 and about 800° C., or between about 400 and about 600° C. Organometallic compounds tend to decompose a lower temperatures (e.g., 200° C. and lower), whereas inorganic metal-containing compounds typically decompose at higher temperatures (e.g., between about 200 and 1000° C.). Typically, the temperature does not exceed about 1000° C., which is adequate for forming most metals, metal alloys, metal oxides, metal nitrides, and/or metal carbides.

The duration of the heat treatment is typically at least sufficient to substantially convert the precursor deposits to the desired state. In general, the temperature and time are inversely related (i.e., conversion is accomplished in a shorter period of time at higher temperatures and vice versa). At the temperatures typical for converting the inorganic metal-containing compounds to a metal alloy set forth above, the duration of the heat treatment is typically at least about 30 minutes (e.g., about 1, 2, 4, 6, or 8 hours, or longer). Preferably, the duration is between about 2 and about 7 hours, or between about 4 and about 6 hours.

G. Supported Powders

Referring to FIG. 1, a carbon supported metal alloy electrocatalyst powder particle 1 produced in accordance with the method of the present invention comprises a carbon support 2 and deposits 3 of the metal alloy on the support. A particle and a powder comprising said particles may have a loading that is up to about 90 weight percent. However, when a supported metal powder is used as a fuel cell electrocatalyst, the loading is typically between about 5 and about 60 weight percent and is preferably between about 20 and about 40 weight percent. Increasing the loading to greater than about 60 weight percent does not typically result in an increase in the activity. Without being held to a particular theory, it is believed that excess loading covers a portion of the deposited metal and the covered portion cannot catalyze the desired electrochemical reaction. On the other hand, the activity of the supported metal electrocatalyst typically decreases significantly if the loading is below about 5 weight percent.

The method of the present invention may be used to produce supported metal alloy powders that are heavily loaded with nanoparticle deposits of a metal alloy that comprises one or more non-noble metals, wherein the deposits have a relatively narrow size distribution. For example, the supported non-noble metal-containing metal alloy powder may have a metal loading of at least about 20 weight percent of the powder, an average deposit size that is no greater than about 10 nm, and a deposit size distribution in which at least about 70 percent of the deposits are within about 50 and 150 percent of the average deposit size. Preferably, the metal loading is between about 20 and about 60 weight percent. More preferably, the metal loading is preferably between about 20 and about 40 weight percent. In one sub-embodiment the average size of the metal alloy deposits is no greater than about 5 nm. In another sub-embodiment the average size of the metal alloy deposits is no greater than about 2 nm. In yet another sub-embodiment the average size of the metal alloy deposits is between about 5 nm and about 10 nm. Preferably, the size distribution of the deposits is such that at least about 80 percent of the deposits are within about 75 and 125 percent of the average deposit size.

H. Benefits of the Suspension-Freeze Embodiment

The method of the present invention results in improvements in the efficiency of preparing supported metal electrocatalyst powders and improvements to the powders themselves. The method allows for control of the stoichiometry of the deposits because the suspension is preferably kept within a single container, the solution is not physically separated from the supports (e.g., by filtration), and freezing results in substantially all of the solute precipitating on the supports. Additionally, the method of the present invention allows for the deposition of compounds which may not be deposited by other methods known in the art. The deposits formed by the present invention are isolated, small, and uniformly dispersed over the surface of the supports and tend to increase electrocatalytic activity. Still further, because filtering is not necessary, extremely fine particles are not lost and the supported metal powders produced by the present method tend to have a greater surface area and activity. Also, the act of depositing the metal species on the supports is fast. For example, immersing a container of the dispersion/suspension in a cryogenic liquid can solidify the dispersion/suspension in about three to four minutes.

I. Definitions

Activity is defined as the maximum sustainable, or steady state, current (Amps) obtained from the electrocatalyst, when fabricated into an electrode, at a given electric potential (Volts). Additionally, because of differences in the geometric area of electrodes, when comparing different electrocatalysts, activity is often expressed in terms of current density (A/cm$^2$).

An alloy may be described as a solid solution in which the solute and solvent atoms (the term solvent is applied to the metal that is in excess) are arranged at random, much in the same way as a liquid solution may be described. If some solute atoms replace some of those of the solvent in the structure of the latter, the solid solution may be defined as a substitutional solid solution. Alternatively, an interstitial solid solution is formed if a smaller atom occupies the interstices between the larger atoms. Combinations of the two types are also possible. Furthermore, in certain solid solutions, some level of regular arrangement may occur under the appropriate conditions resulting in a partial ordering that may be described as a superstructure. These solid solutions may have characteristics that may be distinguishable through characterization techniques such as XRD. Significant changes in XRD may be apparent due to changes in symmetry, if more complete ordering occurs such as that which occurs between Pt metal and Pt$_3$Fe. Although the global arrangement of the atoms is extremely similar in both cases, the relationship between the locations of the Pt and Fe atoms is now ordered and not random resulting in different diffraction patterns. Further, a homogeneous alloy is a single compound comprising the constituent metals. A heterogeneous alloy comprises an intimate mixture of crystals of individual metals and/or metallic compounds. An alloy, as defined herein, is also meant to include materials which may comprise elements which are generally considered to be non-metallic. For example, some alloys of the present invention may comprise oxygen and/or carbon in an amount(s) that a generally considered to be a low or impurity level. See, e.g., Structural Inorganic Chemistry, A. F. Wells, Oxford University Press, 5$^{th}$ Edition, 1995, chapter 29.

A dispersion is a two-phase system in which one phase consists of particles distributed throughout a bulk substance, the particles being the disperse or internal phase and bulk substance the continuous or external phase. The particles may be kept dispersed in the bulk substance by agitation. The particles may be kept dispersed in the bulk substance by the molecular motion in the surrounding medium and/or buoyancy. If this is the case, the dispersion is often referred to as a suspension.

J. EXAMPLES

The method of the present invention was used to synthesize electrocatalyst alloys on carbon support particles. First, a precursor solution comprising the desired metal atoms in the desired concentrations was formed. To prepare an alloy having a target composition of Pt$_{38}$Rh$_7$Mo$_{19}$Ni$_{36}$ on carbon support particles, the precursor solution was prepared by first dissolving about 0.017 g of (NH$_4$)Mo$_7$O$_{24}$.4H$_2$O in about 5 ml H$_2$O. Next, about 0.054 g of Ni(NO$_3$)$_2$.6H$_2$O was dissolved in the molybdate solution. Next, about 0.026 ml of a Rh(NO$_3$)$_3$ solution [about 10 wt % Rh solution in HNO$_3$] was added to the molybdate-nickel nitrate solution to yield a molybdate-nickel nitrate-rhodium nitrate solution that was clear and yellow-green in appearance.

The solution was then introduced into a HDPE (High Density Poly Ethylene) vial containing about 0.200 g of supported platinum powder which had a nominal platinum loading of about 19.2 percent by weight, resulting in a viscous suspension. The suspension was homogenized (i.e., the distribution of supported platinum powder in the precursor solution was substantially uniform) by immersing a probe of a BRANSON SONIFIER 150 into the vials and sonicating the mixture for about 1 minute at a power level of 3.

The vial containing the homogenous viscous suspension was then immersed, but not submersed, in a liquid nitrogen bath for about 3 minutes to freeze the liquid portion of the suspension. Specifically, viscous suspension was cooled through contact with the interior surface(s) of the vial, not by directly contacting the liquid nitrogen as has been done by known spray-freezing methods. Freezing the liquid portion of the suspension (i.e., the precursor solution) forms a solid composite having a substantially uniform distribution of the particles having deposits of inorganic metal-containing compounds (i.e., rhodium-, molybdenum-, and nickel-containing precursor deposits) within a matrix of the solvent in a solid state.

The container of the frozen suspension (i.e., the composite) was then freeze-dried for about 24 hours. Specifically, the freeze-drying process was accomplished using a LAB-CONCO FREEZE DRY SYSTEM (Model 79480). The tray and the collection coil of the freeze dryer were maintained at about 26° C. and about −48° C., respectively, while evacuating the system (the pressure was maintained below about 0.2 millibar). The freeze-drying process removed the ice (frozen solvent or the matrix) leaving behind a freeze-dried powder comprising the supported platinum particles and rhodium-, molybdenum-, and nickel-containing precursor deposits thereon.

The freeze-dried powder was then subjected to a heat treatment to drive off the nitrogen, oxygen and waters of hydration associated with the deposited precursors, to reduce the metal ions of the precursors to metal atoms having a valence of zero, and to alloy said metal atoms with the platinum on the carbon black particles. One particular heat treatment comprised heating the powder in a quartz flow furnace with an atmosphere comprising about 6% H$_2$ and 94% Ar using a temperature profile of room temperature to about 40° C. at a rate of about 5° C./min; holding at about 40° C. for 2 hours; increasing the temperature to about 200° C. at a rate of 5° C./min; holding at about 200° C. for two hours; increasing the temperature at a rate of about 5° C./min to about 700° C.; holding at about 700° C. for about 8 hours; and cooling down to room temperature. Another heat treatment was identical to the foregoing heat treatment except that the maximum temperature was about 900° C.

A second electrocatalyst alloy having a target composition of $Pt_{20}Rh_{20}Mo_{40}Fe_{20}$ was prepared on the carbon support particles. The method of preparing this electrocatalyst was identical except for the preparation of the solution. This solution was prepared first by dissolving about 0.070. g of $(NH_4)Mo_7O_{24}.4H_2O$ in about 3 ml $H_2O$. Then about 0.144 ml of a $Rh(NO_3)_3$ solution [about 10 wt % Rh solution in $HNO_3$] was added to molybdate solution to yield a molybdate-rhodium nitrate source solution that was clear and colorless in appearance. An iron nitrate source solution was prepared by dissolving about 0.080 g of $Fe(NO_3)_3.9H_2O$ in about 2 ml $H_2O$. The iron nitrate source solution was added to the molybdate-rhodium nitrate source solution and the combination was sealed in a vial and heated to about 100° C. for about 2 minutes to completely dissolve the sources solutions and form a molybdate-rhodium nitrate-iron nitrate solution that was clear and yellow-orange in appearance.

The actual compositions of the prepared supported electrocatalyst alloys were analyzed by EDS (Electron Dispersive Spectroscopy) elemental analysis by compressing samples of the powders into pellets having a diameter of 6 mm and a thickness of about 1 mm. The target alloy composition $Pt_{38}Rh_7Mo_{19}Ni_{36}$ had an actual composition of $Pt_{33}Rh_7Mo_{25}Ni_{35}$ and the target alloy composition $Pt_{20}Rh_{20}Mo_{40}Fe_{20}$ had an actual composition of $Pt_{19}Rh_{18}Mo_{46}Fe_{17}$. The method of the present invention produced actual compositions that were quite close to the target compositions in a first attempt. The slight differences observed between the targeted and the measured compositions are due to limitations of the EDS analysis technique.

It is to be understood that the above description is intended to be illustrative and not restrictive. Many embodiments will be apparent to those of skill in the art upon reading the above description. The scope of the invention should therefore be determined not with reference to the above description alone, but should be determined with reference to the claims and the full scope of equivalents to which such claims are entitled.

What is claimed is:

1. A method for forming a supported metal-containing powder, the method comprising:
   (i) forming a dispersion of a particulate support in a solution, the solution comprising a solvent and a dissolved metal, the particulate support comprising a pre-deposited material selected from the group consisting of a pre-deposited metal compound, a pre-deposited metal in its metallic oxidation state, and combinations thereof;
   (ii) removing heat from the dispersion to precipitate the dissolved metal from the solution onto the particulate support and to freeze the solution;
   (iii) after step (ii), separating the particulate support from the frozen solution by freeze drying to yield the supported metal-containing powder, the powder comprising the particulate support and a precipitated metal thereon, wherein during said separation at least a portion of the frozen solution is allowed to melt; and,
   (iv) after step (iii), forming an alloy on the particulate support, the alloy comprising metals derived from the pre-deposited material and the precipitated metal.

2. The method of claim 1 further comprising reducing the precipitated metal on the particulate support.

3. The method of claim 1 wherein the precipitated metal is reduced to its metallic oxidation state.

4. The method of claim 1 wherein the dispersion is formed using a solution comprising a first dissolved metal and a second dissolved metal, both of which are precipitated on the particulate support upon removal of heat from said dispersion.

5. The method of claim 4 further comprising forming an alloy on the particulate support, the alloy comprising metals derived from the first and second precipitated metals.

6. The method of claim 1 wherein the dispersion is within a container having an exterior and heat is removed from the dispersion in step (ii) by contacting the exterior of the container with a cooling medium.

7. The method of claim 6 wherein in step (iii) the separated solution is removed from the container.

8. The method of claim 6 wherein the container has a cover that allows for a gas but substantially no particulate support to exit therefrom.

9. The method of claim 1 wherein the volumetric ratio of the particulate support to the solvent is at least about 1:8.

10. The method of claim 1 wherein the volumetric ratio of the particulate support to the solvent is at least about 1:5.

11. The method of claim 1 wherein the volumetric ratio of the particulate support to the solvent is at least about 1:2.

12. The method of claim 1 wherein the dispersion has a viscosity that is least about 5,000 mPa·s.

13. The method of claim 1 wherein the particulate support are uniformly dispersed in the solution.

14. The method of claim 1 wherein the dispersion is a suspension.

15. A method for forming a supported metal-containing powder, the method comprising:
   (i) forming a dispersion of a particulate support in a solution, the solution comprising a solvent, first dissolved metal and a second dissolved metal;
   (ii) removing heat from the dispersion to precipitate the first dissolved metal and the second dissolved metal from the solution onto the particulate support and to freeze the solution, wherein the heat is removed from the dispersion by contacting a container containing the dispersion with a cryogenic liquid; and
   (iii) after step (ii) separating the particulate support from the frozen solution by freeze-drying to yield the supported metal-containing powder, the powder comprising the particulate support and the precipitated first and second metals thereon.

16. The method of claim 15 further comprising reducing the precipitated first metal or the precipated second metal on the particulate support.

17. The method of claim 16 wherein the precipitated first metal or precipitated second metal is reduced to its metallic oxidation state.

18. The method of claim 16 wherein the precipitated first metal or the precipitated second metal on the particulate support has a deposit size that is less than about 20 nm.

19. The method of claim 16 wherein the precipitated first metal or the precipitated second metal on the particulate support has a deposit size that is between about 2 and about 3 nm.

20. The method of claim 15 wherein steps (i) and (iii) are also performed in the container.

21. The method of claim 20 wherein the container has a cover that allows for a gas but substantially no particulate support to exit therefrom.

22. The method of claim 15 wherein the solvent is selected from the group consisting of water, an alcohol, acetic acid, carbon tetrachloride, ammonia, 1,2-dichloroethane, N,N-dimethylformamide, and formamide.

23. The method of claim 15 wherein the solvent comprises water.

24. The method of claim 15 wherein the first dissolved metal or the second dissolved metal is from a metal-containing compound selected from the group consisting of a metal sulfate, a metal nitrate, a metal nitrite, a metal oxalate, metal acetate, and metal formate.

25. The method of claim 15 wherein the first dissolved metal or the second dissolved metal is from an inorganic metal-containing compound.

26. The method of claim 15 wherein the particulate support are selected from the group consisting of a particulate carbon support and a particulate electrically conductive polymer support.

27. The method of claim 15 wherein the particulate support used to form the dispersion comprises a pre-deposited material selected from the group consisting of a pre-deposited metal compound, a pre-deposited metal in its metallic oxidation state, and combinations thereof, the method further comprising forming an alloy on the particulate support, the alloy comprising metals derived from the pre-deposited material and the precipitated metal, the second precipitated metal, or both.

28. The method of claim 27 wherein the loading of the pre-deposited material on the particulate support is up to about 90 weight percent.

29. The method of claim 27 wherein the loading of the pre-deposited material on the particulate support is between about 5 and about 60 weight percent.

30. The method of claim 27 wherein the pre-deposited material has a deposit size that is less than about 20 nm.

31. The method of claim 27 wherein the pre-deposited material has a deposit size that is between about 2 and about 3 nm.

32. The method of claim 27 wherein the alloy has a deposit size that is less than about 20 nm.

33. The method of claim 27 wherein the alloy has a deposit size that is between about 2 and about 3 nm.

34. The method of claim 15 further comprising forming an alloy on the particulate support, the alloy comprising metals derived from the first and second precipitated metals.

35. The method of claim 15 wherein a post-deposited material is deposited onto the particulate support after step (iii), the post-deposited material being selected from the group consisting of a pre-deposited metal compound, a pre-deposited metal in its metallic oxidation state, and combinations thereof, the method further comprising forming an alloy on the particulate support, the alloy comprising metals derived from the post-deposited material and the first precipitated metal, the second precipitated metal, or both.

36. The method of claim 15 wherein the particulate support has an average size of at least about 100 nm.

37. The method of claim 15 wherein the particulate support has an average size that is between about 200 and about 300 nm.

38. The method of claim 15 wherein the particulate support comprises between about 1 and about 30 weight percent of the dispersion.

39. The method of claim 15 wherein the particulate support comprises between about 1 and about 10 weight percent of the dispersion.

40. The method of claim 15 wherein step (ii) comprises cooling the dispersion at a rate of at least about 20° C./minute.

41. The method of claim 15 wherein step (ii) comprises cooling the dispersion at a rate between about 50 and about 100° C./minute.

42. The method of claim 15 wherein the cryogenic liquid is at a temperature that is at least about 20° C. below the freezing point of the solvent portion.

43. The method of claim 15 wherein the cryogenic liquid is selected from the group consisting of liquid nitrogen, liquid hexane, liquid helium, liquid argon, an ice water/hydrous calcium chloride mixture, an acetone/dry ice mixture, and a diethyl ether/dry ice mixture.

44. A method of forming a carbon supported platinum alloy, the method comprising:
  (i) forming a dispersion of a carbon supported platinum in a solution, the carbon supported platinum comprising a particulate carbon support and platinum in its metallic oxidation state thereon, and the solution comprising a solvent and a dissolved non-platinum metal;
  (ii) removing heat from the dispersion to precipitate the dissolved non-platinum metal from the solution onto the carbon supported platinum and to freeze the solution, wherein the heat is removed from the dispersion by contacting a container containing the dispersion with a cryogenic liquid;
  (iii) separating the frozen solution and the carbon supported platinum by freeze-drying; and
  (iv) after step (iii) forming an alloy on the particulate carbon support to yield the carbon supported platinum alloy, the carbon supported platinum alloy comprising the particulate carbon support and the platinum and the non-platinum metal derived from the precipitated non-platinum metal.

45. A method for forming a supported metal-containing powder, the method comprising:
  (i) forming a dispersion of a particulate support in a solution, the solution comprising a solvent and a dissolved metal, the dispersion comprising about 1 to about 30 weight percent of the particulate support;
  (ii) removing heat from the dispersion to precipitate the dissolved metal from the solution onto the particulate support; and
  (iii) after step (ii), separating the particulate support from the solution to yield the supported metal-containing powder, the powder comprising the particulate support and a precipitated metal.

46. The method of claim 45 wherein the dispersion comprises from about 1 to about 15 weight percent of the particulate support.

47. The method of claim 45 wherein the dispersion comprises from about 1 to about 10 weight percent of the particulate support.

48. The method of claim 45 wherein the dispersion comprises from about 3 to about 8 weight percent of the particulate support.

49. The method of claim 45 wherein separation of the particulate support from the solution is by freeze-drying.

50. The method of claim 45 wherein the particulate support comprises a pre-deposited material selected from the group consisting of a pre-deposited metal compound, a pre-deposited metal in its metallic oxidation state, and combinations thereof, and further wherein the powder resulting from step (iii) comprises the particulate support having therein the pre-deposited material and the precipitated metal.

51. The method of claim 50 further comprising forming an alloy on the particulate support, the alloy comprising metals derived from the pre-deposited material and the precipitated metal.

* * * * *

UNITED STATES PATENT AND TRADEMARK OFFICE
CERTIFICATE OF CORRECTION

| | | |
|---|---|---|
| PATENT NO. | : 7,169,731 B2 | Page 1 of 1 |
| APPLICATION NO. | : 10/777386 | |
| DATED | : January 30, 2007 | |
| INVENTOR(S) | : Chondroudis et al. | |

It is certified that error appears in the above-identified patent and that said Letters Patent is hereby corrected as shown below:

Column 16, claim 15, line 31: "solvent, first dis-" should read -- solvent, a first dis- --.

Signed and Sealed this

Seventh Day of August, 2007

JON W. DUDAS
*Director of the United States Patent and Trademark Office*